United States Patent [19]

Sato et al.

[11] Patent Number: 4,807,047
[45] Date of Patent: Feb. 21, 1989

[54] ELECTRO LUMINESCENCE DEVICE AND ELECTROPHOTOGRAPHIC PRINTING SYSTEM USING THE SAME

[75] Inventors: Seii Sato, Atsugi; Masayuki Wakitani, Kawasaki; Tadashi Hasegawa, Atsugi; Shoshin Miura, Kawasaki; Shizuo Andoh, Kawasaki; Hideaki Takizawa, Kawasaki; Tetsuya Kobayashi, Hadano; Kazuhiro Takahara, Kawasaki; Toyoshi Kawada; Takayuki Hoshiya, both of Atsugi; Shintaro Kisumi, Zama, all of Japan

[73] Assignee: Fujitsu Limited, Kawasaki, Japan

[21] Appl. No.: 914,238

[22] Filed: Oct. 2, 1986

[30] Foreign Application Priority Data

Oct. 4, 1985 [JP] Japan ................... 60-220262
Nov. 6, 1985 [JP] Japan ................... 60-247264
Feb. 7, 1986 [JP] Japan ................... 61-023971
Apr. 18, 1986 [JP] Japan ................... 61-090354
May 13, 1986 [JP] Japan ................... 61-109799

[51] Int. Cl.$^4$ .............................................. H04N 1/23
[52] U.S. Cl. ................................. 358/300; 346/107 R
[58] Field of Search .................. 358/296, 298, 300; 346/107 R, 150; 350/353; 340/781, 825.81; 355/8, 14 R, 14 E

[56] References Cited

U.S. PATENT DOCUMENTS

| | | | |
|---|---|---|---|
| 3,881,921 | 5/1975 | Frank | 350/353 X |
| 4,045,218 | 8/1977 | McVeigh | 355/14 R |
| 4,295,137 | 10/1981 | Haugsjaa | 340/713 X |
| 4,378,956 | 4/1983 | Lester | 346/107 R X |
| 4,478,504 | 10/1984 | Tanaka | 355/8 X |
| 4,535,341 | 8/1985 | Kun et al. | 346/107 R |

Primary Examiner—Clifford C. Shaw
Attorney, Agent, or Firm—Staas & Halsey

[57] ABSTRACT

An EL device having an electrode arrangement including first electrodes and at least one row of second electrodes intersecting the first electrodes and energized by a combination of the first and second electrodes. The second electrodes are divided into a plurality of sub-electrode portions. The electrode arrangement is such that the first electrodes each comprise a plurality of segments that are commonly-connected and intersect different sub-electrode portions. Another electrode arrangement is such that the first electrodes are arranged in a belt form and intersect different sub-electrodes portions in a meander manner.

The EL device can be applied to an electrophotographic printing system as an optical system for forming a latent image. EL elements are repeatedly energized with the same data to give a sufficient intensity of light on a light sensitive medium, and deenergized for a time in which the intensity is decreased to a low level.

39 Claims, 15 Drawing Sheets

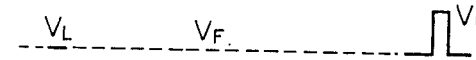
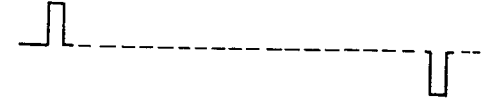
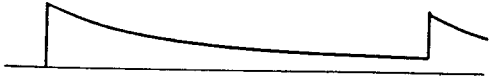
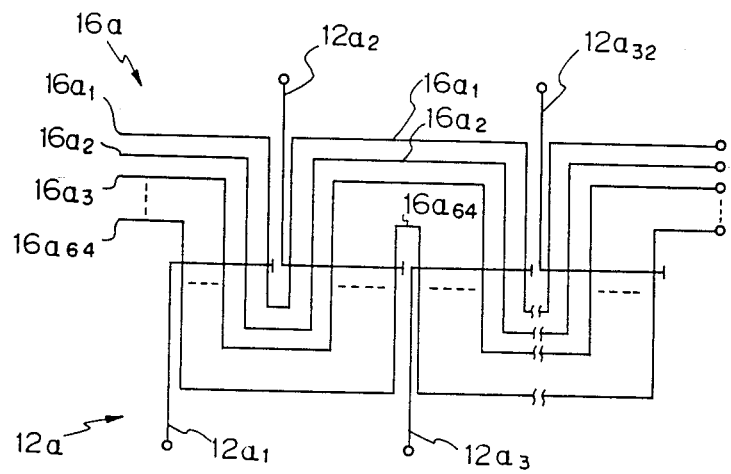

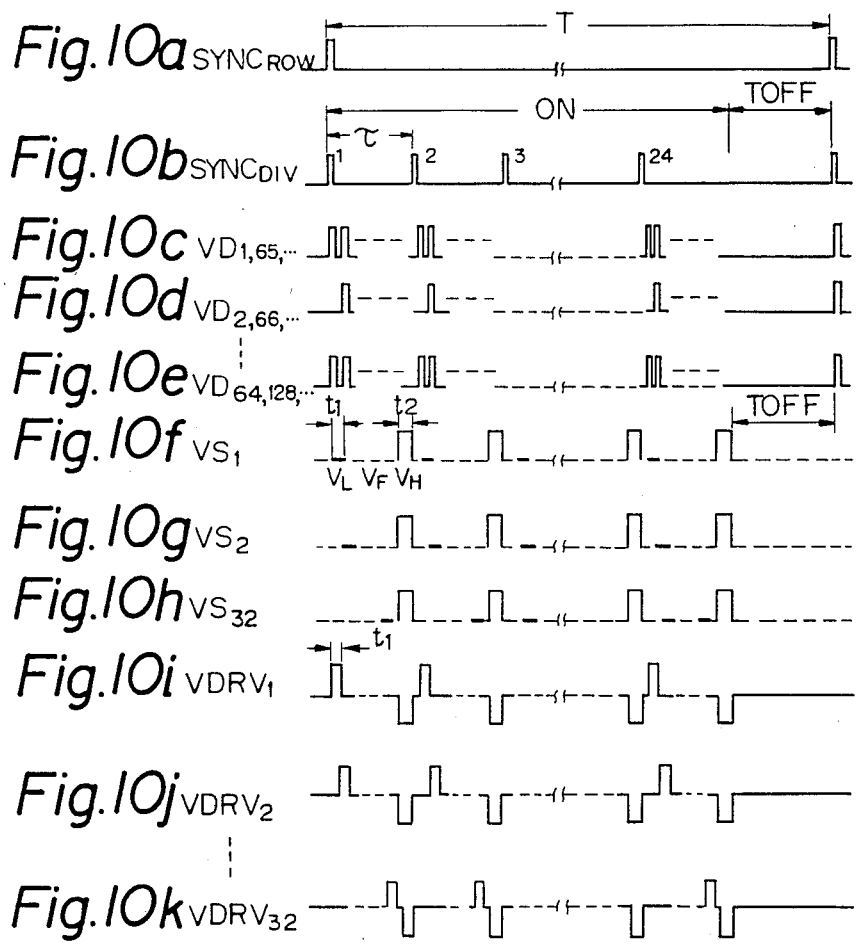

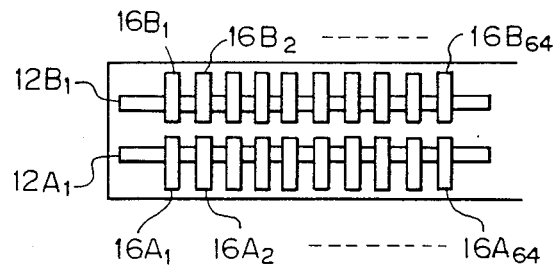
Fig. 20a
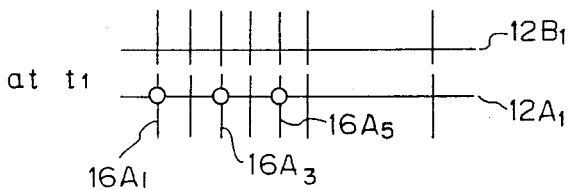
Fig. 20b at t1
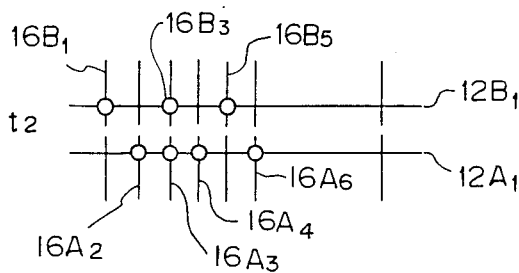
Fig. 20c at t2
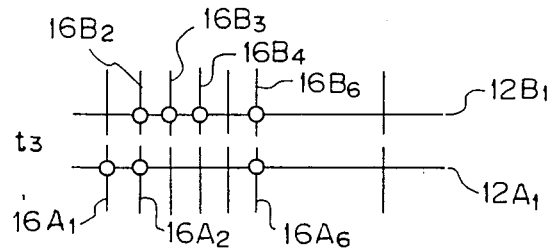
Fig. 20d at t3

ELECTRO LUMINESCENCE DEVICE AND ELECTROPHOTOGRAPHIC PRINTING SYSTEM USING THE SAME

BACKGROUND OF THE INVENTION

1. Field of the Invention

The present invention relates to electro luminescence (EL) devices and electrophotographic printing systems using the same. More particularly, it relates to EL devices having an electrode arrangement including a small number of driving electrodes.

2. Description of the Related Art

EL devices are extensively used as light sources for a variety of apparatuses. The EL device includes at least one row of X direction electrode(s) and a plurality of Y direction electrodes intersecting the X electrode(s). When the capacity of light emitting elements defined by the X direction electrode(s) and the Y direction electrodes in the EL device is increased, the number of electrodes is proportionally increased. Large-scale EL devices of the prior art, however, suffer from the disadvantage that the number of circuit elements for driving the electrodes becomes large, and accordingly, high production costs become inevitable, and the speed at which all of the electrodes can be driven is lowered.

Japanese Unexamined Patent Publication (JPP) No. 59-214672, entitled "an electrophotographic printer", Ishitobi, et al. published on Dec. 4, 1984, discloses the use of an EL panel for an electrophotographic printer. The EL panel is used as a light source instead of a laser optical system or a light emitting diode (LED) array. Electrophotographic printers which use EL panels generally provide the merits of low manufacturing cost, reduced size of the printer, and high quality print outs. JPP No. 59-314672, however, discloses only the use of EL panels of the prior art type, as set forth above, and the principle of the light emitting operation of the EL panel.

EL panels used for electrophotographic printers must be provided with an array containing a large number of EL elements, for example, 1024 or 2048. Accordingly, the electrophotographic printer disclosed in JPP No. 59-214672 suffers from the same disadvantages as set forth above regarding EL devices generally.

In addition, as compared with laser optical and LED array systems, EL panels have an inherent disadvantage of a low light intensity. For example, the light intensity of an EL element is approximately one-hundreth (1/100) of that of one LED. This means that the exposure needed to form a latent image on a light sensitive medium in the electrophotographic printer is insufficient.

SUMMARY OF THE INVENTION

An object of the present invention is to provide an EL device having an electrode arrangement including a reduced number of driving electrodes.

Another object of the present invention is to provide an EL device having an electrode arrangement by which the manufacturing cost and device size are reduced.

Still another object of the present invention is to provide an EL device having an electrode arrangement capable of emitting high intensity light.

Yet another object of the present invention is to provide a control circuit suitable for controlling and driving the above mentioned EL devices.

A further object of the present invention is to provide an EL device and a control circuit suitable for application in an electrophotographic printing system.

Therefore, according to the present invention, there is provided an EL device including a transparent substrate; a first transparent electrode set formed on the substrate; a light emitting layer embedded in an insulating layer on the first electrode set; and a second electrode set formed on the insulating layer on the opposite side of the high emitting layer from the first electrode set. The first electrode set having a plurality of electrodes and the second electrode set having at least one row of electrodes intersecting the plurality of first electrodes.

A plurality of EL elements are defined in the light emitting layer at intersecting portions of the first electrodes and the second electrodes. The second electrodes are separated into a predetermined number of sub-electrode portions. The first electrodes are grouped in a predetermined number of groups, and corresponding electrodes in these groups are electrically connected. Each of the EL elements is energized by a combination of the sub-electrodes of the second electrode and the grouped first electrodes, when supplied with a predetermined AC energizing pulse therebetween.

In another aspect of the present invention, the first electrodes are arranged in a belt form and the belt-formed first electrodes intersect the sub-electrodes in a meander (zigzag) manner. The meander form of the first electrodes may have a rectangular shape, a trapezoid shape, or a half circle shape.

In still another aspect of the present invention, the above EL element arrangement may be applied to a plurality of rows of an EL element arrangement.

According to the present invention, there is also provided an electrophotographic printing system using the above EL device for forming a latent image.

BRIEF DESCRIPTION OF THE DRAWINGS

Other objects and features of the present invention will be described below in detail with reference to the accompanying drawings, in which:

FIGS. 9a to 9e are waveforms of the EL device of FIGS. 5 to 7;

FIGS. 10a to 10k are waveforms of the EL device and the control circuit of FIGS. 5 to 8;

FIG. 11 is a plane view of another embodiment of an electrode arrangement of an EL device in accordance with the present invention;

FIGS. 20a to 20d are views illustrating the operation of the EL device of FIG. 16 and the control circuit of FIG. 19;

DESCRIPTION OF THE PREFERRED EMBODIMENTS

Before describing the preferred embodiments of the present invention, a description will be given of prior EL devices and principles of operation of electrophotographic printing systems wherein EL devices of the present invention can be used.

Figure 1:
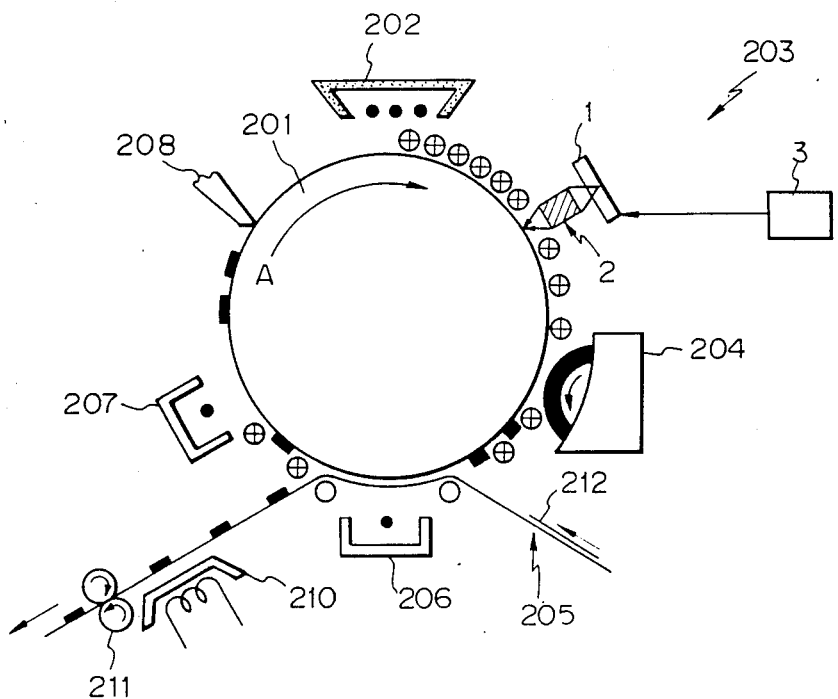
FIG. 1 is a schematic partial section view of an electrophotographic printing system wherein EL devices of the present invention can be used.

Referring to FIG. 1, an electrophotographic printing system is illustrated as including a light sensitive drum 201 coated with a light sensitive layer, a precharger 202 for supplying charges to the light sensitive layer, an optical unit 203, an image developing device 204, a paper delivery unit 205 on which paper is delivered, an image transfer device 206, a discharger 207, a cleaner 208, a thermal-type image fixing device 210, and a pair of delivery rollers 211.

The light sensitive drum 201 rotates in the direction shown by the arrow A in FIG. 1. The light sensitive layer on the drum 201 is charged to a predetermined high voltage on the basis of the principle of corona electrical discharge by the precharger 202. Due to this charge, the light sensitive layer exhibits high resistance. The optical unit 203 emits light beams modulated in response to data to be printed. Portions of the light sensitive layer irradiated by the beams are brought to a low resistance and low voltage state. Toner in the image developing device 204 is deposited on the voltage-reduced portions of the light sensitive layer. This is a principle of an electrostatic latent image formation.

The paper 212 is delivered above the image transfer device 206, and the charged toner on the light sensitive layer on the drum 201 is transferred to the paper 212 by applying an opposite polarity voltage from the image transfer device 206. The paper 212 having the toner thereon is detached from the drum 201 by a paper separator (not shown), and is delivered to the image fixing device 210, which fixes the toner image on the paper. After the paper 212 is detached from the drum 201, images on the light sensitive layer are electrically erased by the discharger 207. Any toner remaining on the light sensitive layer is removed by the cleaner 208. This is a principle of the basic print operation in an electrophotographic printing system.

Figure 2:
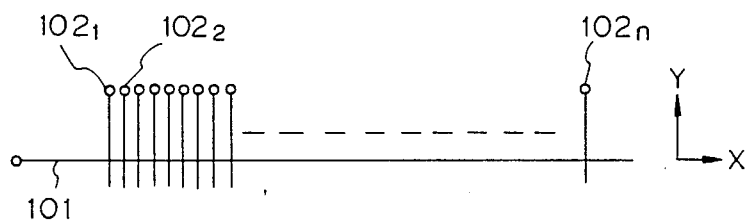
FIG. 2 is a diagram illustrating an electrode arrangement of a prior art EL panel.

In FIG. 1, the optical unit 203 includes an EL panel 1, a control circuit 3, and a light focusing lens unit 2. The use of an EL panel as a light source in an electrophotographic system is disclosed in JPP No. 59-214672, as set forth above. FIG. 2 is a view illustrating the electrode arrangement 10a' of a prior art EL panel used in an electrophotographic printer. The prior art EL panel consists of an X direction rear-electrode 101 and a plurality of Y direction transparent electrodes $102_1$ to $102_n$ provided opposite thereto at a predetermined distance and disposed perpendicularly to the X direction electrode 101. A light emitting layer is formed between the X and Y direction electrodes 101 and $102_1$ to $102_n$. Each electro luminescence (EL) element (cell) is defined by intersecting the X direction electrode 101 and a Y direction electrode. The EL panel used for an electrophotographic printer requires a large number of EL elements, for example, 1024, 2048 or more, and thus the EL panel must have a large number of Y direction electrodes.

Figure 3:
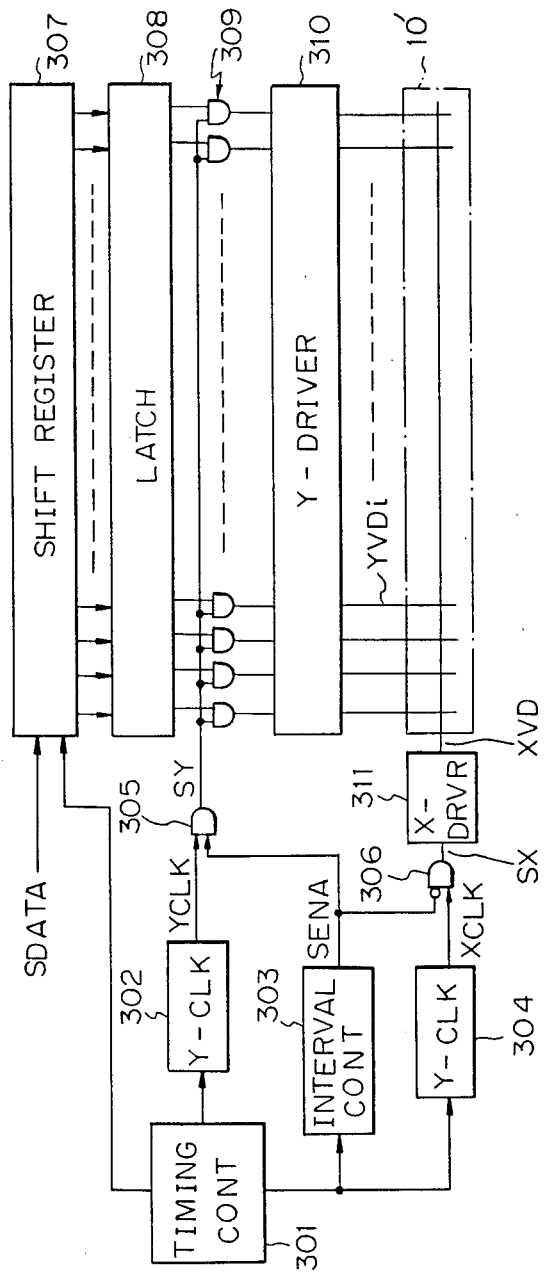
FIG. 3 is a prior art control circuit.

Referring to FIG. 3, a prior art control circuit 3' for controlling a prior art EL panel having an electrode arrangement as shown in FIG. 2, consists of a timing controller 301, a clock generator 302 for energizing the Y direction electrodes, an interval controller 303, a clock generator 304 for energizing the X direction electrode, an AND gate 305, an AND gate 306 having an inverted input, a shift register circuit 307, a latch circuit 308 including flip-flops holding serial data SDATA therein, an AND gate row 309, a Y direction electrode driver 310, and a X direction electrode driver 311.

If the number of Y direction electrodes is 2048, a corresponding number of shift registers, flip-flops, AND gates, and IC driver gates, must be provided. The IC driver gates generally are expensive, because they must carry a high voltage, for example, 200 VDC, to be supplied directly therethrough to the electrodes. Accordingly, the prior art control circuits suffer from the disadvantages of large size circuit construction and a high manufacturing costs.

Figure 4:
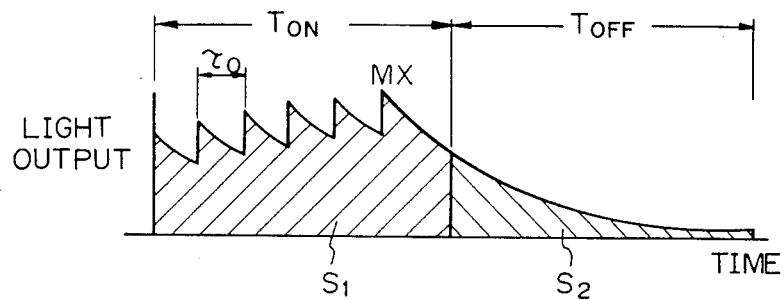
FIG. 4 is a graph illustrating the light-emissions for forming a latent image using an EL device.

FIG. 4 is a graph representing the basic light emitting operation of an EL panel used in the electrophotographic printer. The EL element emits light only when the corresponding intersecting X and Y direction electrodes are supplied with predetermined AC pulse voltages, and the intensity of the emitted light becomes rapidly reduced with elapse of time. The intensity of a single emitted light is not sufficient to form a latent image on the light sensitive layer, and accordingly, a plurality of consecutive light emitting operations must be carried out in a predetermined light exposure time $T_{ON}$. This requires high speed operation of the control circuit.

At the same time, a predetermined OFF time must be maintained to ensure that the formation of the latent image of a next print line is not affected by the previous operation.

Now, preferred embodiments of the present invention will be described.

Figure 5:
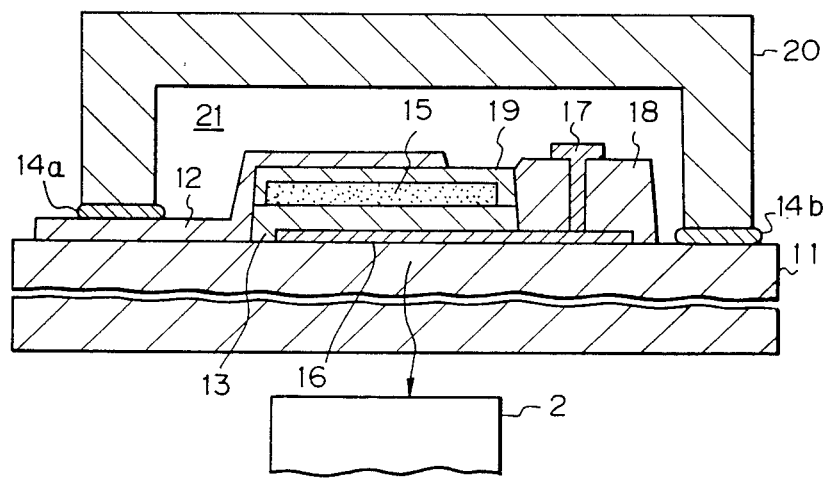
FIG. 5 is a sectional view of an embodiment of an EL device arranged in accordance with the present invention.

Referring to FIG. 5, an EL device 1 includes a glass substrate 11, a transparent electrode 16 of $In_2O_3$ doped with Sn, namely ITO, having a thickness of approximately 200 nm ($200 \times 10^{-9}$ m), a first insulating layer 13 of $Si_3N_4$ having a thickness of approximately 200 nm; a light emitting layer 15 of ZnS doped with 0.5% Mn having a thickness of approximately 600 nm; a second insulating layer 19 of Si3N4 having a thickness of approximately 200 nm; and a rear-electrode 12 of Al having a thickness of approximately 300 nm. The EL device 1 also includes a bus-bar electrode 17 of Al, a cross-over insulator 18, and a protection cover 20 fixed on the glass substrate 11 by adhesive materials 14a and 14b and hermetic-sealing the above elements together with the glass substrate 11. A cavity 21 defined by the protection cover 20 and the glass substrate 11 is filled with a protective gas.

When a predetermined AC pulse voltage is applied between the transparent electrode 16 and the rear-electrode 12, the light emitting layer 15 emits light in two directions. Light directed to the rear-electrode 12 is reflected by the non-transparent Al of rear-electrode 12. Light directed to the transparent-electrode 16 passes through the transparent-electrode 16 and the transparent glass substrate 11, and is introduced into the light focusing lens unit 2. The light focusing lens unit 2 includes a lens array consisting of a plurality of focusing lens. The light focus lens unit 2 receives the incident rays, and makes a normal (non-reversed) and equal size image at its focus point. The focus point may be placed at the light sensitive layer on the light sensitive drum.

The EL elements array, and thus the focus lens array, extend along an axial line on the circumferential plane of the light sensitive drum to simultaneously project a plurality of focused rays on the light sensitive layer.

The formation of the EL device shown in FIG. 5 is as follows:

a. A transparent and electrically conductive layer of ITO is formed on the glass substrate 11. The patterning and etching of the transparent and conductive layer is carried out in a predetermined manner to form EL elements of a predetermined shape and pitch and number so as to form the desired transparent electrode 16.

b. Subsequently, the insulating layer 13 of Si3N4, the light emitting layer 15 of ZnS with 0.5% Mn, and the insulating layer 19 of Si3N4 are formed. By etching the cross-over insulating layer 18, a throughhole is formed at a certain position on the transparent electrode 16.

c. An Al metal layer is deposited on the insulating layer 19 and patterned and etched to form the rear electrode 12. Al is also introduced into the throughhole in insulating layer 18, and a portion of Al extending across the top of the insulating layer 18 is patterned to form the bus-bar electrode.

d. The protective cover 20 is fixedly mounted on the glass substrate 11 by the adhesive materials 14a and 14b, and the cavity 21 is filled with a protective gas, to hermetically seal the glass substrate 11 to the protective cover 20.

Figure 6:
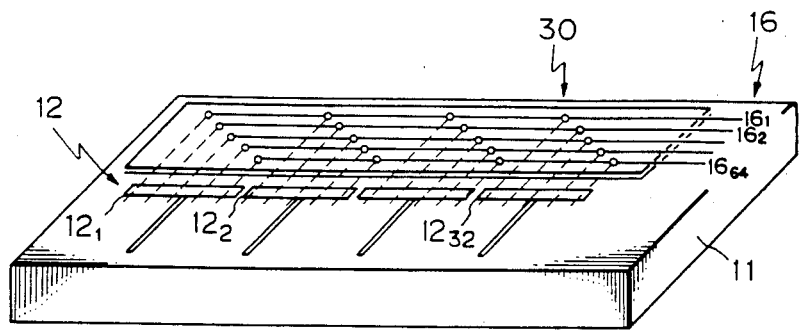
FIG. 6 is a perspective view of electrode arrangement of the EL device of FIG. 5.
Figure 7:
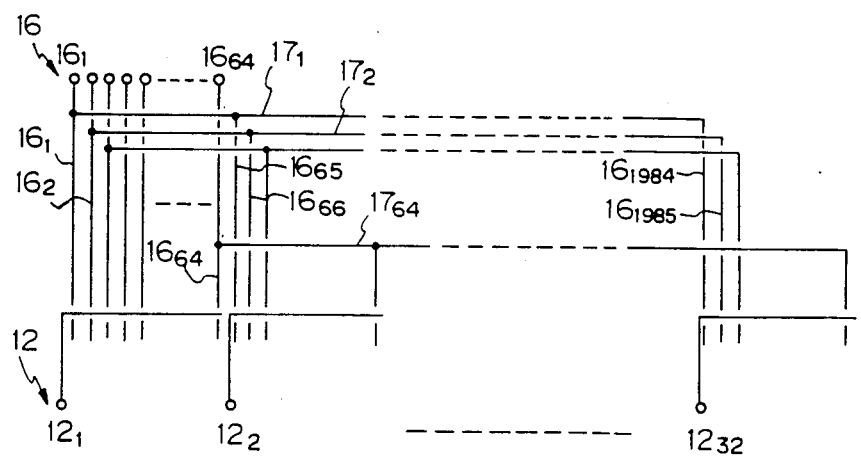
FIG. 7 is a plan view of the electrode arrangement shown in FIG. 6.

FIG. 6 is a perspective view of the electrode arrangement of the EL device shown in FIG. 5. FIG. 7 is a schematic view of the electrode arrangement shown in FIG. 6. In this embodiment, in order to energize a row formed of 2048 EL elements, 2048 transparent electrode segments 16 are provided. These electrode segments 16 are divided into 32 groups, each including 64 electrodes: $16_1$ to $16_{64}$, $16_{65}$ to $16_{128}$, ..., $16_{1984}$ to $16_{2048}$. Also provided are one row of rear electrodes $12_1$ to $12_{32}$. The first transparent electrode segments $16_1, 16_{65}, \ldots, 16_{1984}$ in each group are commonly connected to a first bus-bar electrode $17_1$. The second transparent electrode segments $16_2, 16_{66}, \ldots, 16_{1985}$ in each group are commonly connected to a second bus-bar electrode $17_2$, and so on.

The above electrode arrangement thus has 64 direct drive transparent-electrodes 16 and 32 direct drive rear-electrodes 17, and provides $64 \times 32 = 2048$ EL elements by combining the same. In other words, $64 + 32 = 96$ drive electrodes are able to energize any of the 2048 EL elements.

Figure 8:
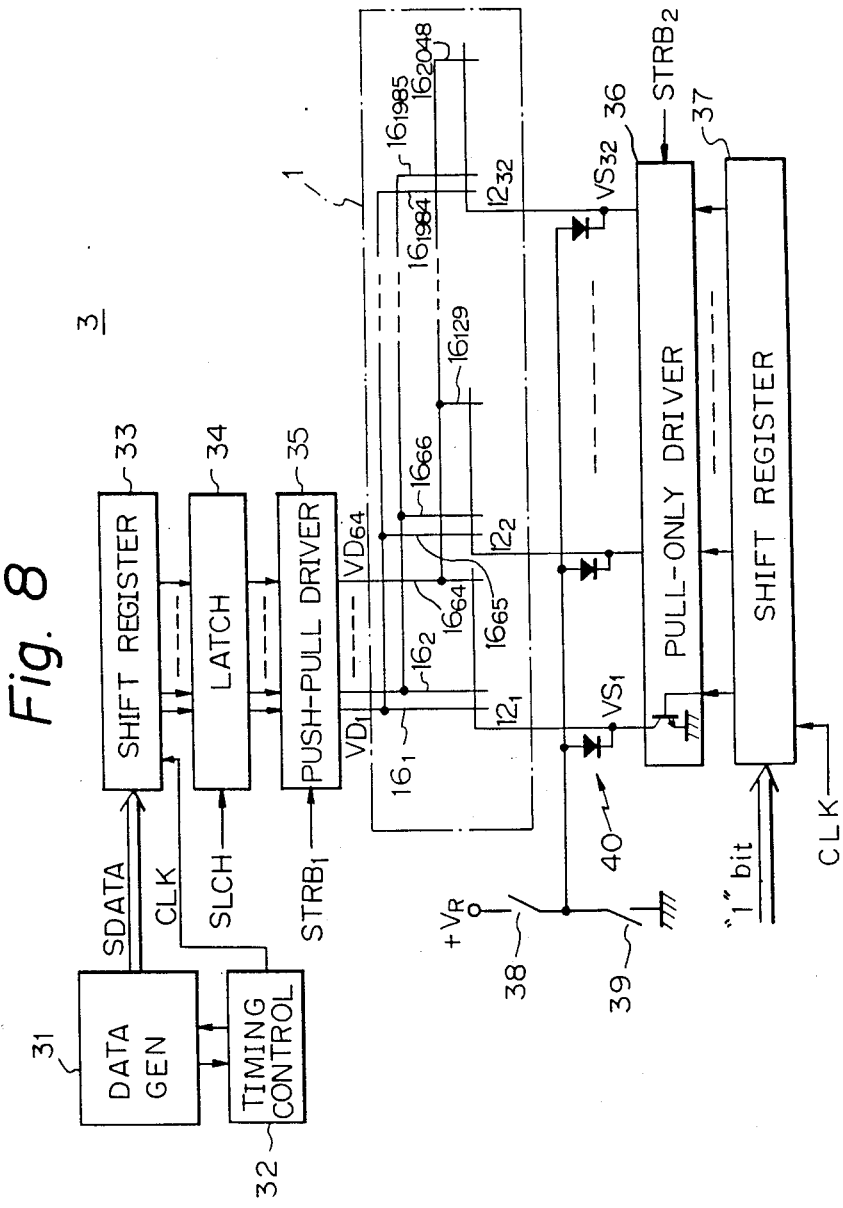
FIG. 8 is a circuit diagram of a control circuit for controlling the EL device shown in FIGS. 5 to 7.

FIG. 8 is a circuit diagram of a control circuit 3 for controlling and driving the EL device 1 shown in FIGS. 5 to 7. The control circuit 3 includes a circuit 31 generating 2048 bits of serial data SDATA to be displayed on the EL device 1, a timing controller 32, a first shift register circuit 33 having 64 shift registers, a latch circuit 34 having 64 flip-flops, and a push-pull driver circuit 35 including 64 IC driver gates having a high-voltage resistance. The control circuit 3 also includes a pull-only driver circuit 36 including 32 IC driver gates having a high-voltage resistance, a second shift register circuit 37 having 32 shift registers, switching elements 38 and 39, and a diode array 40 having 32 diodes for making light emission circuits and preventing short circuits between the IC driver gates in the pull-only driver circuit 36.

At a first scanning cycle, the data generating circuit 31 outputs a first set of serial output data SDATA of first to 64th bits to the shift register circuit 33. The timing controller 32 outputs clock pulse CLK to the shift register circuit 33 to shift-input the serial output data SDATA of 64 bits therein. The timing controller 32 also outputs a latching pulse SLCH to the latch circuit 34, storing 64 bits into the latch circuit 34. At the first scanning cycle, a first shift register of the shift register circuit 37 is set to one, energizing a first IC driver gate in the pull-only driver circuit 36. When a bit of the data SDATA is 1, an EL element $EL_i$ emits light. To emit light from a first EL element, an AC driving voltage $VDRV_1$, which is defined by an equation: $VDRV_1 = VD_1 - VS_1$, where $VD_1$ represents a drive voltage supplied to a first transparent electrode and $VS_1$ a drive voltage, consisting of a low voltage $V_L$, a floating voltage $V_F$ and a high voltage $V_H$, supplied to a first rear-electrode, must be supplied between the transparent electrode and the rear-electrode, as shown in FIG. 9d. In order to supply these drive voltages $VD_1$ and $VS_1$, as shown in FIGS. 9b and 9c, the timing controller sends strobe pulses $STRB_1$ and $STRB_2$, to the push-pull driver circuit 35 and the pull-only driver circuit 36. Upon applying the AC drive voltage $VDRV_1$, the EL element $EL_1$ is instantaneously lit and the light intensity $LI_1$ decreases at once as shown in FIG. 9e. On the other hand, when another bit of the data SDATA is 0, the AC drive voltage $VDRV_i$ is not supplied to a corresponding EL element, and accordingly, the EL elements does not emit light. This operation principle may be applied to 64 bit data stored in the latch circuit 34.

At a second scanning cycle, the data generating circuit 31 outputs a second set of serial output data SDATA of 65th to 128th bits. The data SDATA are shifted in the shift register circuit 33 in response to the clock pulses CLK. The timing controller 32 sends a single clock pulse CLK to the shift register circuit 37, shifting one bit of the data stored in the shift register circuit 37. The timing controller 32 outputs the latching signal SLCH to the latch circuit 34, carrying out the latching of a second 65th to 128th bits of the data SDATA into the latch circuit 34. The emission for the data of the second 65th to 128th bits is also carried out. These operations are consecutively effected to illuminate the data of 2048 bits on the EL device 1.

In the fundamental operation for emitting 2048 EL elements as discussed above, the push-pull driver circuit 35 and the pull-only driver circuit 36 drive 64 electrodes in one drive (or scan) cycle, and the drive operation is repeated 32 times. Although this can require a longer time than the drive time in the prior devices, the number of IC driver gates, which are very costly, is reduced to 92 (=64+32) in this embodiment, and this greatly contributes to a reduction of the manufacturing cost.

Next, the operation of the EL device 1 and the control circuit 3 used in an electrophotographic printing system is described with reference to FIGS. 10a to 10k.

A single emission of the EL element by applying a single AC drive voltage is insufficient to fully form a dot of the latent image on the light sensitive medium on the light sensitive drum. Accordingly, consecutive emissions by a plurality of EL elements is required as shown in FIG. 4 to raise the maximum light intensity MX and to accumulate light energy $S_1$. Obviously the duration time $\tau_0$ in FIG. 4 should be short to increase the maximum light intensity. An ON time $T_{ON}$ is defined by the duration time $\tau_0$ and the repetition number of emissions. At the same time, a predetermined length of an OFF time $T_{OFF}$, which is a decay time, is required to decrease the light intensity to a certain level which does not affect the printing of a paper next in line. Generally, the light energy $S_2$ accumulating from the remaining and decreasing light during the OFF time $T_{OFF}$ is defined by the following formula:

$$S_2 = \int_0^{T_{OFF}} MXe^{-t/\tau_0} \cdot dt \qquad (1)$$

In addition, the contrast C is defined by the following formula:

$$C = S_2/S_1 \qquad (2)$$

Preferably, the contrast C is $$C \lesssim 0.1 \qquad (3)$$

Supposing that the light sensitive medium is A4 size, approximately 29.7 mm×21.1 mm, and two sheets are printed in a time of one minute, when the light emitting layer 15 in the EL device 1 is made of ZnS doped with 0.5 wt.% Mn and the light sensitive medium is of As$_2$Se$_3$, the parameters shown in FIGS. 10a to 10k are as follows:

(a) interval time T for row synchronization signal SYNC$_{ROW}$: 8.8 ms
(b) duration time $\tau$ of scan division synchronization signal SYNC$_{DIV}$ for scanning 32 times in one frame: 340 μs
(c) ON time $T_{ON}$: 8.16 ms
(d) number of scanning repeats: 24
(e) OFF time $T_{OFF}$: 640 μs
(f) accumulated light energy during the ON time, $S_1$: approximately 1 μJ/cm²
(g) contrast: approximately 0.09
(h) amplitude of AC drive voltage: +200 VDC and −200 VDC Whether the pulse voltages VD$_1$ through VD$_{64}$ are at a high level of +200 VDC or a low level of 0 VDC is defined by ones or zeros of a first 64 bits: the first 64th bits stored in the latch circuit 34. The pulse voltages VD$_1$ to VD$_{64}$ are supplied to the transparent electrodes 16$_1$ through 16$_{64}$. One of the rear-electrodes 12$_1$ through 12$_{32}$ is also supplied with a pulse voltage VS. Each pulse voltage VS for energizing a corresponding EL element consists of a low level voltage $V_L$ of 0 VDC, a floating level voltage $V_F$, and a high level voltage $V_H$ of +200 VDC. The low level voltage $V_L$ is generated when the switching elements 38 and 39 are turned OFF and the IC driver gate in the pull-only driver circuit 36 is turned ON, so that a reference voltage $V_R$ of +200 VDC is not transmitted to a common connected point of the switching elements 38 and 39, and the common connected point is grounded through the diode in the diode array 40 and the IC driver gate in the pull-only driver circuit 36. The high level voltage $V_H$ is generated when the switching element 38 is turned ON, the switching element 39 is turned OFF, and the IC driver gate in the pull-only driver circuit 36 is turned OFF, so that the reference voltage $V_R$ is supplied to the rear-electrode through the switching element 38 and the diode. The floating level voltage $V_F$ is defined by a voltage occurring when the switching elements 38 and 39 are turned OFF and the IC driver gate in the pull-only driver circuit 36 is also turned OFF. A duration time $t_1$ of the low level voltage $V_L$ is 10 μs, and a duration time $t_2$ of the high level voltage $V_H$ is 20 μs.

The timing controller 32 controls the output of the above voltages VD$_1$ to VD$_{64}$ and VS$_1$ to VS$_{32}$.

When at least one of the high level voltages of VD$_1$ to VD$_{64}$ is supplied to at least one of the transparent electrodes 16$_1$ to 16$_{64}$, and one of the low level voltages $V_L$ of the pulse voltage VS$_1$ is supplied to the rear-electrode 12$_1$, the corresponding EL elements are supplied with a high level drive voltages VDRV$_1$ to VDRV$_{64}$ of +200 VDC, thereby instantaneously energizing the corresponding EL elements to emit light therefrom. At the end of a first scanning period divided into 24 within the ON time $T_{ON}$, a low level voltage is supplied to the transparent electrodes 16$_1$ to 16$_{64}$ and a high level voltage $V_H$ of +200 VDC is simultaneously supplied to the rear-electrodes 12$_1$ to 12$_{32}$, with the result that the drive voltages VDRV$_1$ to VDRV$_{32}$ of −200 VDC are supplied to all of the EL elements.

During the ON time $T_{ON}$, the illumination operation is effected 24 times sequentially, and the latent image formation is effected.

Then, during the OFF time $T_{OFF}$, the transparent electrodes 16$_1$ to 16$_{64}$ and the rear-electrodes 12$_1$ to 12$_{32}$ are supplied with a low voltage, and thus all of the EL elements are deenergized to a light level which does not affect the next in line image formation.

A second embodiment of another EL device of the present invention will be described with reference to FIGS. 11 to 13.

FIG. 11 illustrates the electrode arrangement of an EL device 1a; FIG. 12 is a partial sectional view of the EL device 1a; and FIG. 13 is a perspective view of the EL device 1a. In the drawings, the EL device 1a includes a glass substrate 11, a transparent electrode 16a, a first insulating layer 13, a light emitting layer 15, a second insulating layer 19, and a rear electrode 12a. The protective cover 20 shown in FIG. 5 may be provided, if necessary.

Figure 12:
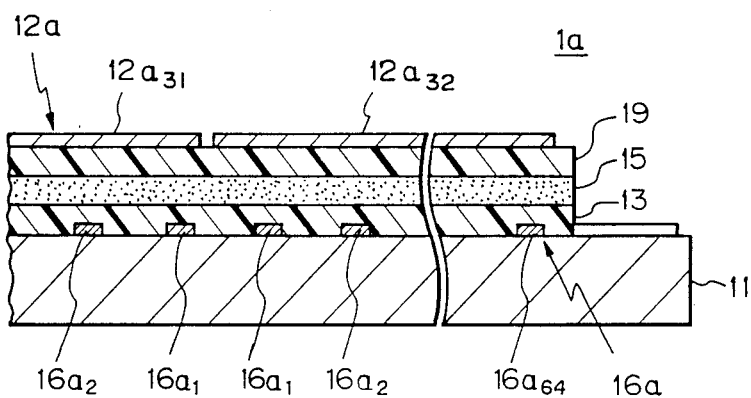
FIG. 12 is a section view of the EL device of FIG. 11.
Figure 13:
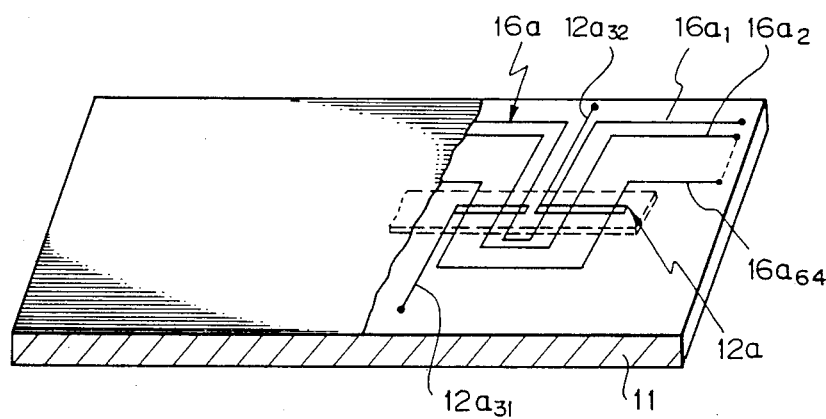
FIG. 13 is a perspective view of the EL device of FIG. 12.

The rear-electrode 12a is divided into 32 sub-rear electrodes 12a$_1$ to 12a$_{32}$ as shown in FIGS. 12 and 13.

The transparent electrode 16a includes 64 sub-transparent electrodes $16a_1$ to $16a_{64}$. The sub-transparent electrodes $16a_1$ to $16a_{64}$ are formed in a meander (zigzag) line and each has a segment which intersects each sub-rear electrode. The light emitting layer 15 is formed, between the sub-rear electrodes $12a_1$ to $12a_{32}$ and the sub-transparent electrodes $16a_1$ to $16a_{64}$, to define 2048 EL elements.

According to the above electrode arrangement, the cross-over electrodes 17 and the throughholes therefor, as shown in FIGS. 5 and 6, are not necessary. As a result, the manufacturing process is simplified and the yield of the EL device is improved in comparison to those of the EL device shown in FIGS. 5 to 7.

Figure 14:
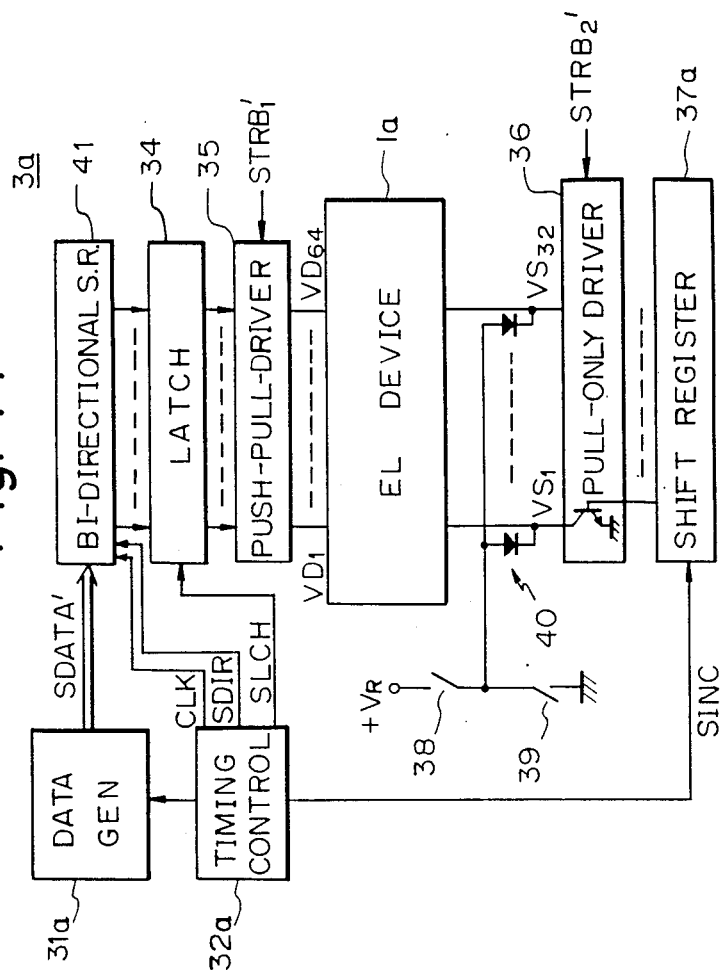
FIG. 14 is a circuit diagram of a control circuit for controlling the EL device of FIGS. 11 to 13.

The FIG. 14 is a circuit diagram of a control circuit 3a for controlling and driving the EL device 1a shown in FIGS. 11 to 13.

Referring to FIG. 11, the sub-transparent electrode $16a_1$ has a segment that is intersected at a right end under the sub-rear electrode $12a_1$, a segment at a left end under the sub-rear electrode $12a_2$, and so on. That is, the sub-transparent electrodes $16a_1$ to $16a_{64}$ have segments that are alternatively placed under the respective sub-rear electrodes $12a_1$ to $12a_{32}$. Accordingly, the sequence of a set of 64 bits of data must be reversed, as follows:

TABLE 1

| Sub-rear electrode selection | Sequence of 64 bit data |
|---|---|
| $12a_1$ | 64, 63, . . . , 2, 1 |
| $12a_2$ | 65, 66, . . . , 127, 128 |
| $12a_{31}$ | 1983, 1982, . . . , 1919, 1918 |
| $12a_{32}$ | 1984, 1985, . . . , 2047, 2048 |

The control circuit 3a differs from the control circuit 3 shown in FIG. 8, in that the control circuit 3a includes a data generator 31a, a bi-directional shift register circuit 41, a timing controlling 32a, and a shift register circuit 37a. Other circuit elements bearing the same references as in FIG. 8 are substantially identical to those shown in FIG. 8.

The data generator 31a outputs sets of 64 bit data, i.e., 1 to 64 bits, 65 to 128 bits, . . . , 1984 to 2048 bits, to the bi-directional shift register circuit 41. The bi-directional shift register circuit 41 includes 64 shift registers and has a bi-directional shift feature, well known in this field. When a shift direction signal SDIR from the timing controller 32a is a logical high level, the bi-directional shift register circuit 41 inputs the set of 64 bit data and shifts the same in a forward direction, otherwise the bi-directionl shift register circuit 41 shifts the same in a reverse direction. The timing controller 32a outputs a low level shift direction signal SDIR when odd sub-rear electrodes $12a_1$, $12a_3$, . . . , $12a_{31}$ are selected, or otherwise, outputs a high level SDIR. The shift register circuit 37a includes 32 shift registers, and the timing controller 32a sets "1" to a first shift register at an initial condition of each scanning cycle.

At a first scanning cycle, 64 to 1 bits are latched in the latch circuit 34 and 64 IC driver gates are energized in the push-pull driver circuit 35. At the same time, a first IC driver gate in the pull-only driver circuit 36 is energized. As a result, the sub-transparent electrodes $16a_1$ to $16a_{64}$ and the sub-rear electrode $12a_1$ are energized to illuminate 64 to 1 EL elements. The principle of emission is basically the same as that in FIG. 8. At a second scanning cycle, the sub-transparent electrodes $16a_1$ to $16a_{64}$ for 65 to 128 bit data and the sub-rear electrode $12a_2$ are energized, and subsequently, other sets of 64 bit data are selected to emit light from corresponding EL elements.

The above bi-directional shift operation can be realized by a variety of methods. For example the data generator 31a can output sets of 64 bit data as shown in Table 1.

Figure 15A:
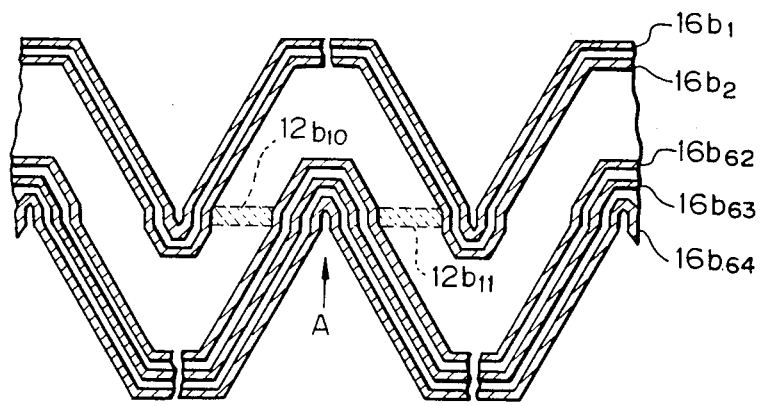
FIGS. 15a to 15c are plan views of a modification of the electrode arrangement of FIG. 11.
Figure 15B:
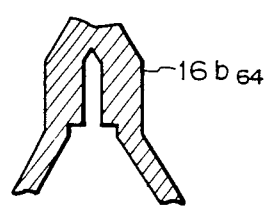
Figure 15C:
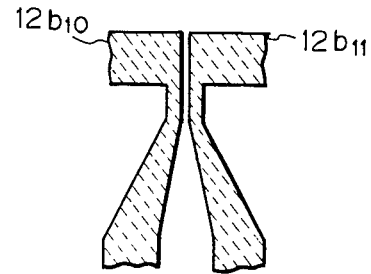

Referring to FIGS. 15a to 15c, a modified electrode arrangement of the EL device shown in FIGS. 11 to 13 will be described. Sub-transparent electrodes $16b_1$ to $16b_{64}$ are formed in a trapezoid or triangle zigzag belt, as shown in FIG. 15a. FIGS. 15b and 15c are partial enlarged plan views of a segment of the sub-transparent electrode $16b_{64}$ and a portion of sub-rear electrodes $12b_{10}$ and $12b_{11}$ at a point A in FIG. 15a. This modified sub-transparent electrode arrangement has the merit of a short electrode length which contributes to a reduction of the power loss caused by resistance, in comparison to the sub-transparent electrode arrangement shown in FIG. 11.

From the viewpoint of shortening the length of the sub-transparent electrodes, a half-circle zigzag form is preferable.

Still another embodiment of an EL device and a control circuit therefor suitable for use in an electrophotographic printing system will be described.

Figure 16:
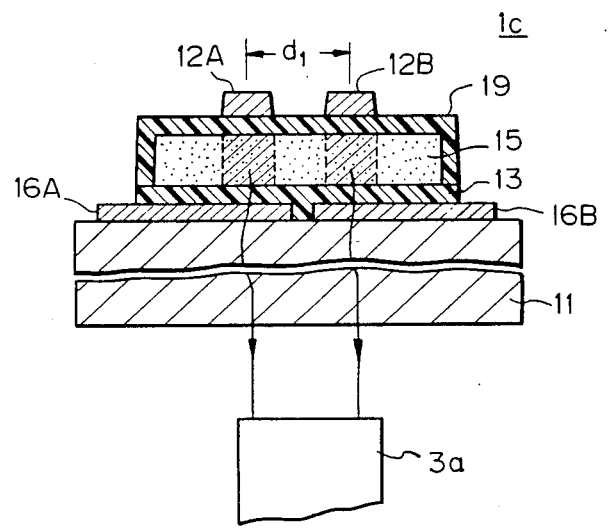
FIG. 16 is a sectional view of still another embodiment of an EL device in accordance with the present invention.

Referring to FIG. 16, an EL device 1c includes a pair of EL element rows; one row consisting of an ITO transparent electrode 16A, of $In_2O_3$ doped with Sn, an insulating layer 13 of $Si_3N_4$, a light emitting layer 15 of ZnS with 0.5% wt. Mn, another insulating layer 19 of $Si_3N_4$, and a first rear-electrode 12A of Al, and the other row consisting of a second transparent electrode 16B, the insulating layer 13, the light emitting layer 15, the insulating layer 19, and a second rear-electrode 12B. These EL element rows are formed on a glass substrate 11. Each transparent electrode 16A or 16B consists of 2048 sub-transparent electrodes.

Both EL element rows have the same structure and face, center-to-center, the rear-electrodes 12A and 12B at a distance $d_1$. Each element row may be formed in any one of the electrode arrangements set forth above.

Figure 17:
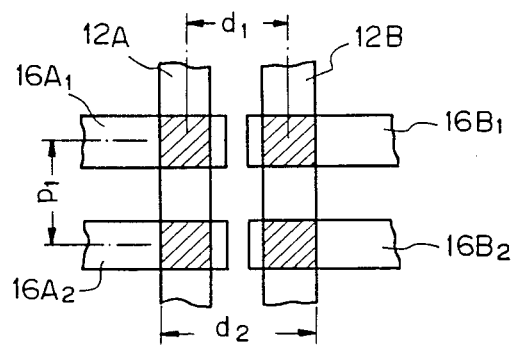
FIG. 17 is a partial plan view of the EL device of FIG. 16.

Referring to FIG. 17, a partial plan view of the electrode arrangement of FIGS. 6 and 7 is represented. If a resolution of the print is 10 dots/mm, a pitch $P_1$ between the transparent electrodes $16A_1$ and $16A_2$ or $16B_1$ and $16B_2$ is 0.1 mm and the distance $d_1$ of the rear-electrodes 12A and 12B from center-to-center is also 0.1 mm.

Figure 18:
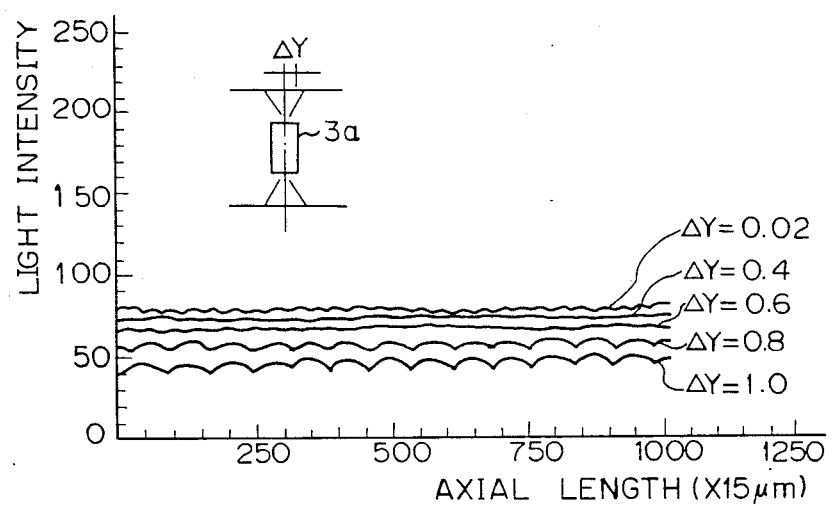
FIG. 18 is a graph representing the change in the light intensity caused by deviation between an optical axis of the focusing lens and the direction of light emitted from an EL element in an EL device.

A focus lens array 3a includes a plurality of lens. According to experiments, a deviation $\Delta Y$ between the center portion of the EL element and the optical axis of the focus lens should be smaller than 0.4 mm, as shown in FIG. 18. In FIG. 18, the abscissa indicates a length in an axial direction of the light sensitive drum and the ordinate indicates light intensity.

Figure 19:
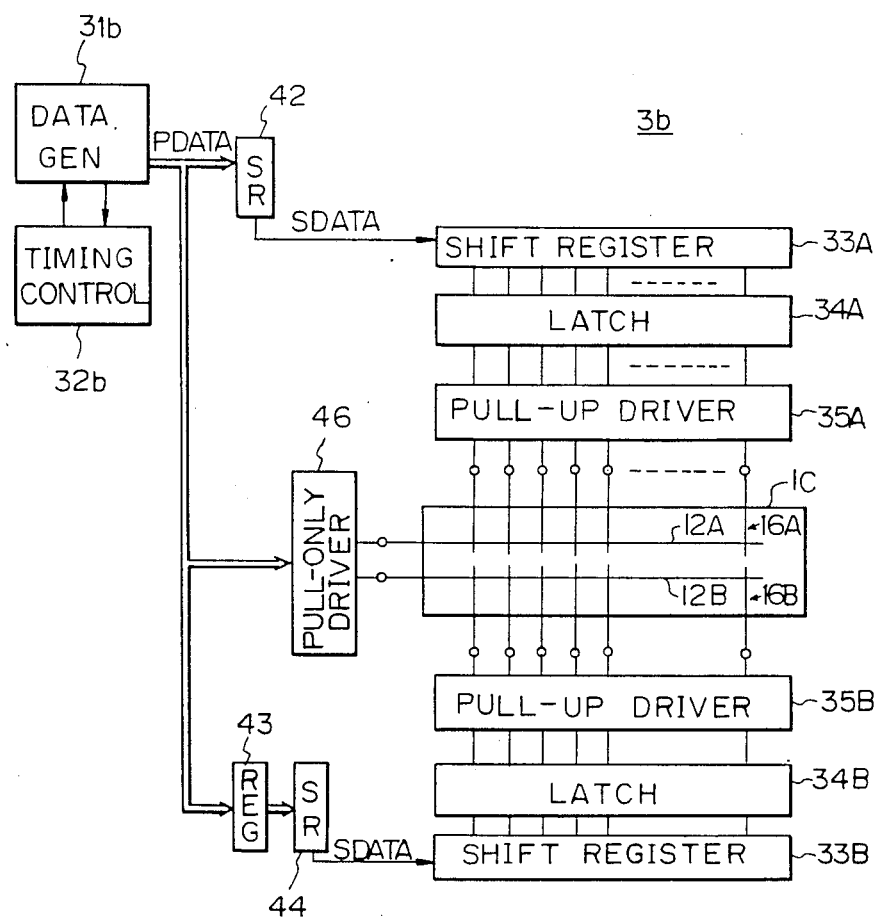
FIG. 19 is a circuit diagram of a control circuit for controlling the EL device of FIG. 16.

Referring to FIG. 19, a control circuit 3b includes a data generator 31b outputting parallel data PDATA, a timing controller 32b, a shift register circuit 42 having 64 shift registers, a first shift register circuit 33A having 64 shift registers, a first latch circuit 34A having 64 flip-flops, a first pull-up driver circuit 35A having 64 IC driving gates, and a pull-only driver circuit 46 having two rows of IC drivers, each row consisting of 32 IC driver gates. The control circuit 3b also includes a register circuit 43 having 64 registers, a shift register circuit 44 having 64 shift registers, a second shift register circuit 33B having 64 shift registers, a second latch circuit 34B having 64 flip-flops, and a second pull-up driver circuit 35B having 64 IC driver gates. The circuit construction of a first circuit of the first shift register circuit 33A, the first latch circuit 34A and the first pull-up driver circuit 35A is substantially identical to that of a second circuit of the first shift register circuit 33B, the second latch circuit 34B, and the second pull-up driver circuit 35B.

The operation of the EL device 1c shown in FIGS. 16 and 17 by the control circuit 3b shown in FIG. 19 will be described with reference to FIGS. 20a to 20d.

FIG. 20a represents two sets of the electrode arrangements, one set consisting of the rear-electrode $12A_1$ and a group of transparent electrodes $16A_1$ to $16A_{64}$, and the other set consisting of the rear-electrode $12B_1$ and a group of transparent electrodes $16B_1$ to $16B_{64}$. FIGS. 20b to 20d are views illustrating the emission of the EL elements at times $t_1$ to $t_3$. In FIGS. 20b to 20d, small circles represent emitting EL elements.

In order to simplify the description of the operation, the operation for illuminating 64 dots on one line will be described. The data generator 31b sends first parallel data PDATA of 64 bits to the shift register circuit 42 and the register circuit 43. The parallel data PDATA held in the shift register circuit 42 is converted into serial data SDATA, and is consecutively shifted into the shift register circuits 33A. After that, the second parallel data PDATA to be printed on a next line of the light sensitive medium is held in the shift register circuit 42. Simultaneously, the first parallel data PDATA stored in the register circuit 43 is transferred to the shift register circuit 44. Then, the second parallel data PDATA is stored in the register circuit 43. At the same time, the data stored in the shift register circuit 44 is converted into serial data SDATA, and transferred to the shift register circuit 33B. As can be seen from the above description, the first shift register circuit 33A receives the data one cycle before the second shift register circuit 33B.

At a time $t_1$, the first data held in the shift register circuit 33A is latched at the latch circuit 34A. The transparent electrodes $16A_1$, $16A_3$ and $16A_5$ are energized through the pull-up driver circuit 35A in response to the latched data. At the same time, the rear-electrode $12A_1$ is energized through the pull-only driver circuit 46. The EL elements on the rear-electrode $12A_1$ emit light as shown in FIG. 20b. However, the EL elements on the rear-electrode $12B_1$ do not emit light at the time $t_1$ because the shift register circuit 33B and the latch circuit 34B have been cleared. At a time $t_2$, after the elapse of one cycle, the second data is transferred to the first shift register circuit 33A and latched at the first latch circuit 34A. Simultaneously, the first data is transferred to the second shift register circuit 33B and latched at the second latch circuit 34B. As a result, as shown in FIG. 20c, the transparent electrodes $16A_2$, $16A_3$, $16A_4$ and $16A_6$ and the rear-electrode $12A_1$, and the transparent electrodes $16B_1$, $16B_2$, and $16B_5$ and the rear-electrode $12B_1$ are respectively energized, simultaneously. The light sensitive medium on the light sensitive drum is rotated and advanced one dot line for one cycle between the times $t_1$ and $t_2$. Accordingly, the same dots on one dot line are exposed twice by the EL elements on the transparent electrodes $16A_1$, $16A_3$ and $16A_5$ and the rear-electrode $12A_1$ and the next EL elements on the transparent electrodes $16B_1$, $16B_3$ and $16B_5$ and the rear-electrode $12B_1$. The above operation is carried out at a time $t_3$.

By providing two rows of EL elements and controlling them as described above, the same dot on the light sensitive medium is exposed twice to the same intensity light, and thus is given a doubled light energy. In other words, in order to give the same intensity of light to the dots on the light sensitive medium, the scanning number is reduced by half, for example, 12 times from 24 times, as shown in FIGS. 10a to 10k. This enbles the printing speed of the electrophotographic printing system to be increased.

Figure 21:
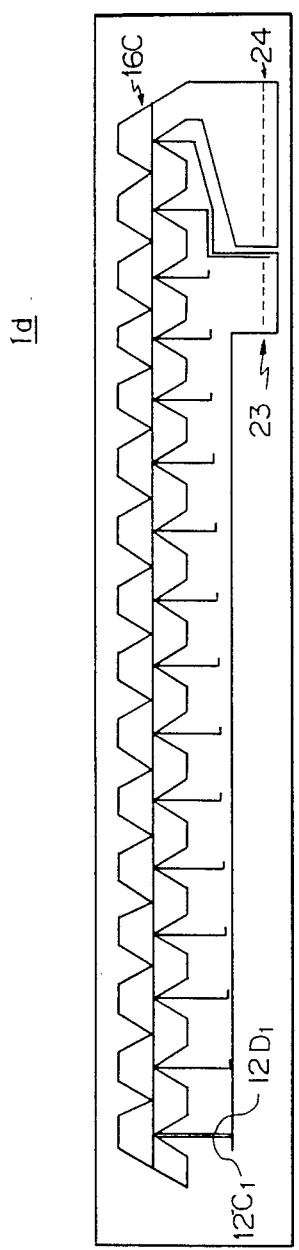
FIG. 21 is a plan view of a modification of the electrode arrangement of FIG. 17.

Referring to FIG. 21, another EL device 1d using the same electrode arrangement as shown in FIGS. 15a to 15c of two rows of EL elements, similar to that in FIG. 16, is illustrated. A trapezoid meander-formed transparent electrode 16C consisting of 64 sub-transparent electrode segments $16C_1$ to $16C_{64}$ as shown in FIG. 15a is formed, and 32 pairs of rear-electrodes $12C_1$ and $12D_1$ to $12C_{32}$ and $12D_{32}$ are also formed. A terminal 23 is provided for connecting the rear-electrodes to the pull-only driver circuit, and a terminal 24 is provided for connecting the sub-transparent electrodes to the push-up driver circuit.

This electrode arrangement has the merit of the common use of trapezoid meander-formed transparent electrode 16C for forming two rows of EL elements.

A control circuit for controlling the EL device 1d shown in FIG. 21 may be constructed by combining the circuit shown in FIG. 14 and the circuit shown in FIG. 19.

Figure 22:
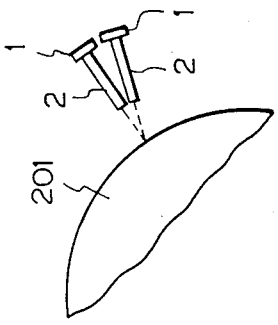
FIG. 22 is a partial sectional view of an electrophotographic printing system using a modified EL device of the present invention.

In order to further increase the intensity of light emitted from the EL device and projected onto the light sensitive layer, three or more rows of EL elements may be provided together with another focusing lens unit having three or more lens arrays adjusted thereto. Two or more EL devices each having two rows of EL elements as set forth above and two or more focusing lens units each also having two focusing lens arrays, can be combined as shown in FIG. 22.

In the above embodiments, the EL devices and control circuits therefor are described with reference to specific applications in connection with electrophotographic printing systems. Nevertheless, the EL devices and the control circuits of the present invention can be applied to a variety of systems.

Many widely different embodiments of the present invention may be constructed without departing from the spirit and scope of the present invention. It should be understood that the present invention is not limited to the specific embodiments described in this specification, except as defined in the appended claims.

We claim:

1. An electrophotographic printing system comprising:
    means movable along a predetermined path and coated with a light sensitive medium,
    means for precharging said light sensitive medium,
    means for forming a latent image on said light sensitive medium,
    means for attaching a printing medium at said latent image formed portions on said light sensitive medium,
    means for transferring said attached printing medium from said light sensitive medium, and
    means for discharging said light sensitive medium,
    said latent image forming means comprising an EL device, means for focusing light emitting from said EL device onto said light sensitive medium and means for controlling the energization of said EL device, said EL device comprising:

a light emitting layer;

a plurality of first electrodes, each comprising a plurality of spaced, electrically connected electrode segments;

a plurality of spaced second electrodes, each comprising a plurality of spaced, electrically connected electrode portions, said first and second electrodes being arranged on respective opposite sides of said light emitting layer, with each first electrode segment disposed in electro luminescing relationship with respect to a corresponding second electrode portion to form an EL element therebetween, and with each first electrode forming such an EL element with each second electrode, said EL elements being disposed in a single line extending transversely of said path, whereby an AC energizing pulse supplied by said controlling means between a given first electrode and a given second electrode causes the EL element formed therebetween to emit light to said focusing means.

2. An electrophotographic printing system as set forth in claim 1 wherein said control means comprises a plurality of circuit elements driving respective first electrodes and a plurality of circuit elements driving respective second electrodes.

3. An electrophotographic printing system as set forth in claim 2 wherein said control means is operable for repeatedly energizing said EL elements a predetermined number of times with data for forming a latent image in a predetermined period within a predetermined ON time by supplying AC energizing pulses between said first electrodes and said second electrodes through said driving circuit elements, and for deenergizing said EL elements for a predetermined OFF time.

4. An electrophotographic printing system as set forth in claim 3 wherein said predetermined number of times and said predetermined period are designed to cause emission of a predetermined light intensity sufficient to form said latent image, and said OFF time is designed to permit decrease of said emitted light to a level which will not form a latent image.

5. An electrophotographic printing system as set forth in claim 1 wherein the pitch between adjacent electrode portions of each second electrode is defined by the resolution of the latent image formation.

6. An electrophotographic printing system as set forth in claim 1 wherein said first electrodes are arranged in a belt form, said belt-form first electrodes being disposed to intersect said second electrodes in a meander manner.

7. An electrophotographic printing system as set forth in claim 6 wherein said control means comprises a plurality of circuit elements driving respective first electrodes and a plurality of circuit elements driving respective second electrodes.

8. An electrophotographic printing system as set forth in claim 7 wherein said control means comprises means for arranging the order of data to form a latent image defined by the position of said meander form first electrodes intersecting said second electrodes.

9. An electrophotographic printing system as set forth in claim 8 wherein said control means is operable for repeatedly energizing said EL elements a predetermined number of times with data for forming a latent image in a predetermined period within a predetermined ON time by supplying AC energizing pulses between said first electrodes and said second electrodes through said driving circuit elements, and for deenergizing said EL elements for a predetermined OFF time.

10. An electrophotographic printing system as set forth in claim 9 wherein said predetermined number of times and said predetermined period are designed to cause emission of a predetermined light intensity sufficient to form said latent image, and said OFF time is designed to permit decrease of said emitted light to a level which will not form a latent image.

11. An electrophotographic printing system according to claim 10 wherein the pitch between adjacent electrode portions of said second electrode is defined by the resolution of the latent image formation.

12. An electrophotographic printing system as set forth in claim 6 wherein said meander form of said first electrodes is rectangular in shape.

13. An electrophotographic printing system as set forth in claim 6 wherein said meander form of said first electrodes is trapezoidal in shape.

14. An electrophotographic printing system as set forth in claim 6 wherein said meander form of said first electrodes is semi-circular in shape.

15. An electrophotographic printing system as set forth in claim 1 wherein said second electrodes are arranged in two separate groupings with the groupings spaced apart a predetermined distance to present separate arrays of said EL elements.

16. An electrophotographic printing system as set forth in claim 15 wherein said control means comprises two sets of circuit elements for driving respective first electrodes and two sets of circuit elements for driving respective second electrodes.

17. An electrophotographic printing system as set forth in claim 16 wherein said control means comprises means for alternatively providing the same data to the sets of circuit elements in response to the moving speed of said light sensitive medium so that the same positions on the latter may be exposed twice to the same data.

18. An electrophotographic printing system as set forth in claim 17 wherein said control means is operable for repeatedly energizing said EL elements a predetermined number of times with data for forming a latent image in a predetermined period within a predetermined ON time by supplying AC energizing pulses between said first electrodes and said second electrodes through said driving circuit elements, and for deenergizing said EL elements for a predetermined OFF time.

19. An electrophotographic printing system as set forth in claim 18 wherein said predetermined number of times and said predetermined period are designed to cause emission of a predetermined light intensity sufficient to form said latent image, and said OFF time is designed to permit decrease of said emitted light to a level which will not form a latent image.

20. An electrophotographic printing system as set forth in claim 19 wherein the pitch between adjacent electrode portions of the second electrode is defined by the resolution of the latent image formation.

21. An electrophotographic printing system as set forth in claim 15 wherein said first electrodes are arranged in a belt form, said belt-form first electrodes intersecting each of said second electrodes in a meander manner.

22. An electrophotographic printing system as set forth in claim 21 wherein said control means comprises two sets of circuit elements for driving respective first electrodes and two sets of circuit elements for driving respective second electrodes.

23. An electrophotographic printing system according to claim 22 wherein said control means comprises means for alternatively providing the same data to said sets of control elements in response to the moving speed of the light sensitive medium so that the same positions on the latter are exposed twice to the same data and means for arranging the order of data to form a latent image defined by the position of said meander-form first electrodes intersecting the second electrodes.

24. An electrophotographic printing system as set forth in claim 23 wherein said control means is operable for repeatedly energizing said EL elements a predetermined number of times with data for forming a latent image in a predetermined period within a predetermined ON time by supplying AC energizing pulses between said first electrodes and said second electrodes through said driving circuit elements, and for deenergizing said EL elements for a predetermined OFF time.

25. An electrophotographic printing system as set forth in claim 24 wherein said predetermined number of times and said predetermined period are designed to cause emission of a predetermined light intensity sufficient to form said latent image, and said OFF time is designed to permit decrease of said emitted light to a level which will not form a latent image.

26. An electrophotographic printing system as set forth in claim 25 wherein the pitch between adjacent electrode portions on said second electrode is defined by the resolution of the latent image formation.

27. An electrophotographic printing system as set forth in claim 21 wherein said meander form of said first electrodes is rectangular in shape.

28. An electrophotographic printing system as set forth in claim 21 wherein said meander form of said first electrodes is trapezoidal in shape.

29. An electrophotographic printing system as set forth in claim 21 wherein said meander form of said first electrodes is semi-circular in shape.

30. An elongated plane-illumination type electro luminescence device comprising:
a transparent substrate:
first transparent electrode means formed on said substrate;
a light emitting layer embedded in an insulating layer on said first electrode means;
second electrode means formed on said insulating layer on the opposite side of the light emitting layer from said first electrode means,
said first transparent electrode means comprising a plurality of first electrode groups, each including a plurality of spaced, electrically connected electrode segments,
said second electrode means comprising a plurality of spaced second electrode groups, each including a plurality of spaced, electrically connected electrode portions,
said first and second electrode groups being arranged with each first electrode segment disposed in electro luminescing relationship with respect to a corresponding second electrode portion to form an EL element therebetween and with each first electrode group forming such an EL element with each second electrode group, said EL elements being disposed in a single line extending longitudinally of the device; and
control means for supplying an AC energizing pulse between a given first electrode group and a given second electrode group to thereby cause the corresponding EL element formed therebetween to emit light.

31. An electro luminescence device as set forth in claim 30 wherein said first electrode means is arranged in a belt form and disposed to intersect said second electrode means in a meander manner.

32. An electro luminescence device as set forth in claim 31 wherein said meander form of said first electrode groups is rectangular in shape.

33. An electro luminescence device as set forth in claim 31 wherein said meander form of said first electrode means is trapezoidal in shape.

34. An electro luminescence device as set forth in claim 31 wherein said meander form of said first electrode means is semi-circular in shape.

35. An electro luminescence device as set forth in claim 30 wherein said second electrode groups are arranged in two separate groupings with the groupings spaced apart a predetermined distance to present separate arrays of said EL elements.

36. An electro luminescence device as set forth in claim 35 wherein said first electrode means is arranged in a belt form and disposed to intersect each of said second electrode groupings in a meander manner.

37. An electro luminescence device as set forth in claim 36 wherein said meander form of said first electrode means is rectangular in shape.

38. An electro luminescence device as set forth in claim 36 wherein said meander form of said first electrode means is trapezoidal in shape.

39. An electro luminescence device as set forth in claim 36 wherein said meander form of said first electrode means is semi-circular in shape.

* * * * *

UNITED STATES PATENT AND TRADEMARK OFFICE
CERTIFICATE OF CORRECTION

PATENT NO. : 4,807,047
DATED : February 21, 1989
INVENTOR(S) : SEII SATO et al.

It is certified that error appears in the above-identified patent and that said Letters Patent is hereby corrected as shown below:

Front Page [57] ABSTRACT, line 12, "trodes" should be --trode--.

Col. 1, line 29, "an electrophotographic printer" should be --An Electrophotographic Printer--;
line 38, 59-314672, should be --59-214672--.

Col. 2, line 59, after "of" insert --the--;

Col. 4, line 35, "a X" should be --an X--;
line 43, delete "a".

Col. 5, line 42, after "formed." insert --Then, the cross-over insulating layer 18 is formed--;
line 63, "trodes:" should be --trode segments:--;

UNITED STATES PATENT AND TRADEMARK OFFICE
CERTIFICATE OF CORRECTION

PATENT NO. : 4,807,047

DATED : February 21, 1989

INVENTOR(S) : Seii Sato et al

Page 2 of 2

It is certified that error appears in the above-identified patent and that said Letters Patent is hereby corrected as shown below:

Col. 9, Table 1, between the lines "$12a_2$ and $12a_{31}$" insert a colon --:--.

Signed and Sealed this

Eighteenth Day of July, 1989

Attest:

DONALD J. QUIGG

Attesting Officer

Commissioner of Patents and Trademarks